Figure 1:
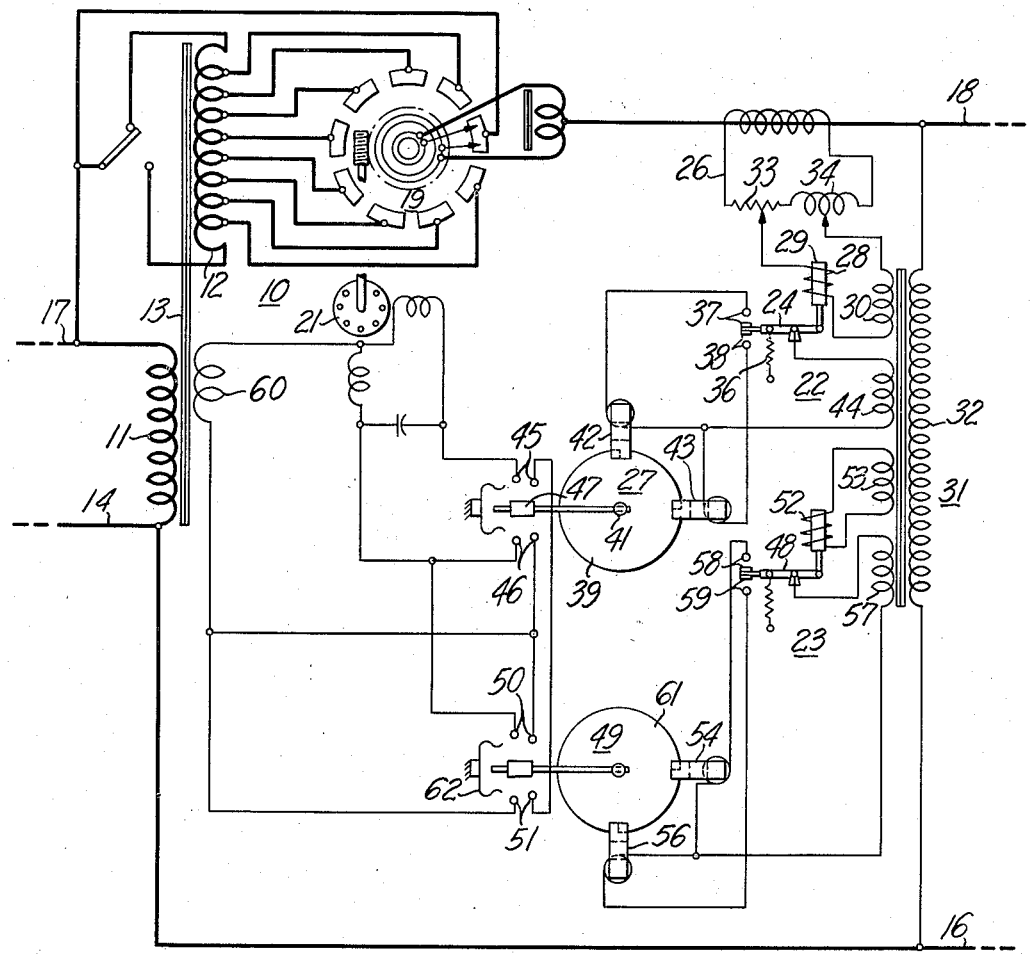

Oct. 21, 1958 W. C. SEALEY 2,857,565
VOLTAGE REGULATING CONTROL SYSTEM SELECTIVELY
RESPONSIVE TO VOLTAGES OF DIFFERENT LOADS
Filed Aug. 3, 1953 2 Sheets-Sheet 1

Inventor
William C. Sealey
by Joseph E. Kerwin
Attorney

United States Patent Office 2,857,565
Patented Oct. 21, 1958

2,857,565

VOLTAGE REGULATING CONTROL SYSTEM SELECTIVELY RESPONSIVE TO VOLTAGES OF DIFFERENT LOADS

William C. Sealey, Wauwatosa, Wis., assignor to Allis-Chalmers Manufacturing Company, Milwaukee, Wis.

Application August 3, 1953, Serial No. 371,919

5 Claims. (Cl. 323—43.5)

This invention relates in general to voltage regulating systems and more particularly to an improved voltage regulating system in which the motor of the voltage regulator is selectively controlled by electroresponsive devices operating in response to voltages of the load circuit at two different points.

Most regulating systems which have been suggested in the prior art regulate the voltage of the load circuit at some predetermined point, usually the load center. In some of these suggested systems regulation is accomplished by means of a motor operated voltage regulator which is controlled by an electroresponsive device. The electroresponsive device is positioned close to the regulator but connected through compensating means to measure the voltage at the load center and selectively energize the motor of the regulator whenever the voltage at the load center varies outside predetermined limits. The voltage at the load center varies first because the voltage being supplied to the regulator is usually not constant, and second because the current being supplied to the load causes a voltage drop in the line between the regulator and the load center.

As the load center is moved farther from the regulator this line drop voltage increases. To compensate for the increase in line drop the regulator must supply a larger voltage at its terminals, if the voltage at the load center is to be maintained within the predetermined limits. For example, assume it is desired to maintain the voltage at the load center between one hundred nineteen and one hundred twenty-one volts, that the voltage drop in the line caused by load current is twelve volts, and that the regulator is designed to operate with ten percent regulation on either side of the predetermined limits. It is therefore possible to obtain a maximum voltage of one hundred thirty-two volts at the terminals of the regulator. As a result, loads which are connected relatively close to the regulator received substantially the full one hundred thirty-two volts supplied to the load circuit. While most load devices are capable of handling one hundred thirty-two volts without immediate damage, their useful operating life is substantially decreased if this voltage is maintained for any length of time. This is especially true if the loads are lighting fixtures or household appliances such as radios and television sets.

If the change in voltage at the load center were caused solely by the line drop voltage, it would be possible to limit the voltage at the regulator by a simple mechanical limit switch. However, since the voltage supplied to the regulator may increase also, a mechanical limit switch could not limit the voltage at the output terminals of the regulator.

To overcome this disadvantage it is proposed according to the present invention to provide an improved regulating system which utilizes a pair of electroresponsive devices cooperating with each other to control the motor of the voltage regulator in response to conditions of the load circuit at two points. These electroresponsive devices regulate the voltage at one point remote from the regulator within predetermined limits as long as the voltage at a second point close to the regulator remains below a set value. If the voltage at the second point exceeds this set value the devices cooperate with each other to regulate the voltage within second predetermined limits at the latter point. This system therefore allows the regulator to maintain the voltage at a remote point relatively constant between first predetermined limits until an unsafe voltage is reached at a point close to the regulator, at which time the voltage at the latter point is regulated within second predetermined limits. If the voltage at the latter point subsequently drops below the set value, the voltage at the remote point is again regulated between predetermined limits by the system.

It is therefore an object of the present invention to provide an improved voltage regulating system which regulates the voltage at a remote point of the load circuit within predetermined limits without subjecting the load devices which are connected close to the regulator to unsafe voltages.

Another object of the present invention is to provide an improved voltage regulating system which selectively regulates the voltage at two points in the load circuit.

A further object of the present invention is to provide in a motor operated regulating system improved means for selectively energizing the motor in response to conditions of the load circuit at two points.

Figure 2:
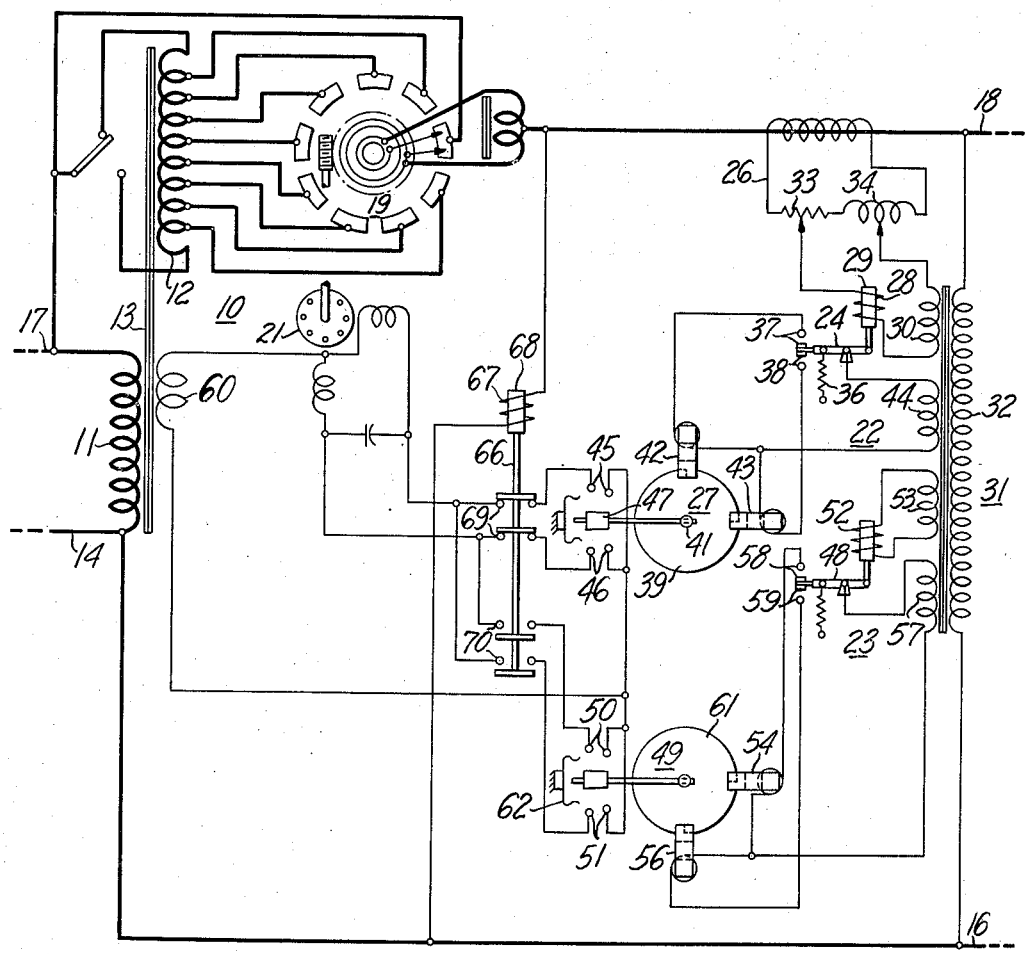

Objects and advantages other than those mentioned above will be apparent from the following description when read in connection with the drawings in which:

Fig. 1 is a schematic diagram of the regulating system embodying the present invention; and Fig. 2 is a modification of the system shown in Fig. 1.

The regulating system shown schematically in Fig. 1 comprises generally a voltage supply circuit, a load circuit, regulating means for interconnecting these circuits, and means for selectively energizing the motor which actuates the regulating means.

Any suitable type motor operated regulating means may be used to interconnect the supply circuit with the load circuit. As shown in the preferred embodiment, the regulating means comprises a step type voltage regulator 10 having an exciting winding 11 and a series winding 12 which are inductively connected by core 13. Supply conductor 14 is connected directly to load conductor 16 and supply conductor 17 is connected to load conductor 18 through series winding 12 and a tap switch 19 of regulator 10. The voltage impressed on the load circuit by regulator 10 is increased or decreased by movement of tap switch 19 in a manner well known in the art. Movement of tap switch 19 is accomplished by motor 21 and any suitable gear reducing mechanism (not shown).

Energizing of motor 21 is controlled by a first electroresponsive device 22 and a second electroresponsive device 23. Device 22 comprises contact making voltmeter 24, line drop compensating means 26 for voltmeter 24, and time delay means for preventing motor 21 from being actuated by momentary fluctuations of load voltage.

Contact making voltmeter 24 has a coil 28 and a core 29. Coil 28 is energized from secondary winding 30 of transformer 31 which has its primary winding 32 connected across the load conductors 16 and 18. Coil 28 is connected in series with winding 30 through resistance element 33 and reactive element 34 of the line drop compensating means 26. By adjusting the line drop compensating means 26 in a manner well known in the art, contact making voltmeter 24 measures the voltage at a predetermined point of the load circuit. Spring 36 biases contacts 37 and 38 to a normally open position when voltmeter 24 is suitably adjusted.

Any suitable time delay means may be provided with device 22. As shown in Fig. 1 time delay relay 27 has a disk 39, a shaft 41, first and second contacts 45 and 46, and a pair of electromagnets 42 and 43 of the shading coil type which are energized from secondary winding 44 of potential transformer 31. Winding 44 energizes electromagnet 42 when contacts 37 of voltmeter 24 close, causing disk 39 to rotate on shaft 41. Rotation of disk 39 for the time delay period causes bridging member 47 on disk 39 to close contacts 45. Contacts 46 are closed in a similar manner when contacts 38 of voltmeter 24 close to energize electromagnet 43.

Electroresponsive device 23 is similar to device 22 in that it comprises a contact making voltmeter 48 and an induction disk time delay relay 49 which has first and second contacts 50 and 51. However, potential coil 52 of contact making voltmeter 48 is connected directly to secondary winding 53 of potential transformer 31 and therefore measures the voltage of the load circuit at a point close to the regulator. Electromagnets 54 and 56 are energized from secondary winding 57 through contacts 58 and 59 respectively, of voltmeter 48. First and second contacts 50 and 51 of time delay relay 49 are actuated in the same manner as contacts 45 and 46 of relay 27.

Reversible motor 21 which actuates tap switch 19 has its windings supplied from a suitable voltage source such as secondary winding 60 of regulator 10. As shown in Fig. 1 the motor windings are energized from secondary winding 60 by closing both contacts 45 and 51 which are connected in series. Closing both contacts 45 and 51 causes motor 21 to rotate in a predetermined direction and move tap switch 19. The motor windings are also connected to secondary winding 60 of regulator 10 through contacts 46 or 50 which are connected in parallel. Closing of either contacts 46 or contacts 50 causes motor 21 to rotate in the reverse direction.

The operation of the system shown in Fig. 1 is as follows. Assume that tap switch 19 is on a zero tap position and supply conductors 14 and 17 have been connected to a suitable voltage source. The voltage between load conductors 16 and 18 at all points of the load circuit is substantially that of the voltage source since no current is flowing in the load conductors. Assume further that a load is connected at some remote point but not energized and that this load operates more efficiently when the voltage supplied to it is kept between predetermined limits, for example, 119 to 121 volts. Contact making voltmeter 24 and line drop compensator 26 are suitably adjusted so that contacts 37 close when the voltage at this point is below 119 volts and contacts 38 close when the voltage at this point is above 121 volts. After this adjustment contact making voltmeter 24 remains in the neutral position shown in Fig. 1 when the voltage at the remote point is between 119 and 121 volts.

Assume also that another load is connected to the circuit at a point close to the regulator but not energized and that the voltage at this close point must be kept below a maximum value so as not to damage the load. If for example, this load can operate without damage on voltages up to 128 volts, contact making voltmeter 48 is adjusted so that contacts 59 close when the voltage at the close point is below 127 volts and contacts 58 close when the voltage is above 128 volts. Contact making voltmeter 48 therefore remains in the neutral position shown in Fig. 1 when the voltage at the close point is between 127 and 128 volts.

If the voltage of the supply source is 120 volts when conductors 14 and 16 are connected to it, the voltage of the load circuit is also 120 volts since as yet the loads are assumed not to be in operation. Contacts 37 and 38 of voltmeter 24 remain in the open or neutral position as shown. However, contacts 59 of voltmeter 48 close since the voltage at the close point is below 127 volts.

Closing of contacts 59 energizes electromagnet 56 which causes disk 61 to rotate and close raise contacts 51. Since raise contacts 45 are open motor 21 is not energized by closing of raise contacts 51.

When the load at the remote point is energized the current flowing to the load causes the voltage at the remote point to decrease because of the voltage drop in the line. Device 22 which is responsive to the voltage at the remote point operates to regulate the voltage between 119 and 121 volts by causing regulator 10 to increase or decrease its voltage to compensate for the voltage drop in the line.

However, if in compensating for the line drop voltage the regulator has to supply a voltage higher than 128 volts at its terminals, it is prevented from doing so by operation of device 23. Voltmeter 48 being responsive to the voltage close to the regulator causes contacts 59 to open and deenergize electromagnet 56. Spring 62 then opens raise contacts 51 and motor 21 is deenergized, which stops tap switch 19 from further increasing the voltage. As long as voltage drop in the line causes the voltage at the remote point to remain below 119 volts, the voltage at the close point will be maintained between 127 and 128 volts, provided that the voltage being supplied to the regulator is constant.

If for some reason, such as an increase in the voltage of the supply, the voltage at the close point exceeds 128 volts, contacts 58 close to energize electromagnet 54 which causes lower contacts 50 to close after the time delay period. Closing of lower contacts 50 causes motor 21 to move tap switch 19 and decrease the voltage of the load circuit. Tap switch 19 continues to move until the voltage at the close point returns to 128 volts and lower contacts 50 open.

The system shown in Fig. 2 is similar to that shown in Fig. 1. However, raise contacts 51 and 45 are connected in parallel rather than in series as they were in Fig. 1. Also electroresponsive device 23 includes a voltage relay 66 which is responsive to the voltage at the point close to the regulator. Relay 66 comprises a coil 67, a core 68, a first pair of normally closed contacts 69 and a second pair of normally open contacts 70. Relay 66 may be adjusted so that contacts 69 open and contacts 70 close when the voltage of the load circuit exceeds a set value. Motor 21 therefore responds to closing of contacts 45 and 46 of device 22 when contacts 69 are closed and responds to closing of contacts 50 and 51 of device 23 when contacts 70 are closed. By properly adjusting devices 22 and 23, the system of Fig. 2 can be made to operate substantially as the system of Fig. 1.

These systems thus prevent loads which are connected close to the regulator from being damaged from an excessive voltage but allow the voltage being supplied to distant loads to be maintained relatively constant.

Although only two embodiments of the present invention have been illustrated and described, it will be apparent to one skilled in the art that various changes and modifications may be made therein without departing from the spirit of the invention or from the scope of the appended claims.

It is claimed and desired to secure by Letters Patent:

1. In a control system for regulating the voltage of a load circuit within predetermined limits independent of the variation of the voltage of a supply circuit, the combination of a voltage regulator having a tap switch, a motor to move said tap switch to vary the voltage of said load circuit relative to the voltage of said supply circuit, first means responsive to the voltage of said load circuit at a first point remote from said tap switch, said first means comprising a first contact making voltmeter connected at said regulator and a line drop compensator connected to said first voltmeter so that said first voltmeter responds to the voltage at said remote point, second means responsive to the voltage of said load circuit at a second point close to said regulator, said second means comprising a second contact making voltmeter connected at said regulator to measure the voltage at said close point independent of said first means, and, means to cause said motor to be selectively responsive to said first means to move said tap switch to raise and lower the voltage at said remote point when the voltage at said close point is below a predetermined value and to cause said motor to be responsive to said first or second means to move said tap switch to lower the voltage when the voltage at said close point exceeds a predetermined value.

2. In a control system for regulating the voltage of a load circuit within predetermined limits independent of the variations of the voltage of a supply circuit, the combination of a voltage regulator having a tap switch, a motor to move said tap switch to vary the voltage of said load circuit relative to the voltage of said supply circuit, first means responsive to the voltage of said load circuit at a first point remote from said tap switch, said first means comprising first and second contacts, time delay means operable to selectively close said first and second contacts a predetermined time after being energized, a first contact making voltmeter operable to selectively energize said time delay means in response to the voltage of said load circuit at said remote point, and a line drop compensator, said first voltmeter connected to said load circuit at said regulator through said compensator to measure the voltage at said first point, second means responsive to the voltage of said load circuit at a second point close to said regulator, said second means comprising first and second contacts, second time delay means operable to close said last mentioned first and second contacts a predetermined time after being energized, a second contact making voltmeter operable to selectively energize said second time delay means in response to the voltage of said load circuit at said second point, said second voltmeter being connected to said load circuit at said regulator to measure the voltage at said second point, first circuit means including in parallel said first contacts of said first and second means to cause said motor to be responsive to closing of either of said first contacts to move said tap switch to lower the voltage at said points, and second circuit means including in series said second contacts of said first and second means to cause said motor to be responsive to closure of both said second contacts to move said tap switch to raise the voltage at said points.

3. A system for regulating the voltage of a load circuit independent of variations of the voltage of a supply circuit comprising in combination a voltage regulator connected between said circuits, first means responsive to the voltage at a remote point of said load circuit and effective to directly operate said regulator to cause said regulator to maintain said voltage at said remote point between predetermined limits, and second means responsive to the voltage at a point of said load circuit intermediate said regulator and said remote point and effective to directly operate said regulator to prevent the voltage at said intermediate point from exceeding a predetermined value, the operation of said second means being independent of said voltage at said remote point.

4. A system for regulating the voltage of a load circuit independently of variations in voltage of a supply circuit comprising in combination a voltage regulator connected between said circuits, first means responsive to the voltage at a remote point of said load circuit operable to directly cause said regulator to maintain the voltage at said remote point between first predetermined limits, second means responsive to the voltage of said load circuit at a point intermediate said remote point and said regulator operable to directly cause said regulator to maintain the voltage at said intermediate point between second predetermined limits, and switch means responsive to the voltage at said intermediate point to cause selective operation of said first and second means.

5. A system for regulating the voltage of a load circuit independently of variations in voltage of a supply circuit comprising in combination a voltage regulator connected between said circuits, motor means for operating said regulator to vary the voltage supplied to said load circuit from said regulator, first means responsive to the voltage at a remote point of said load circuit operable to energize said motor means to cause said regulator to maintain said voltage at said remote point between first predetermined limits, second means responsive to the voltage at a point close to said regulator operable to energize said motor to cause the voltage at said close point to be maintained between second predetermined limits, said second means including contact means to render said first means inoperable when said voltage at said close point is between said second predetermined limits.

References Cited in the file of this patent
UNITED STATES PATENTS

| | | |
|---|---|---|
| 2,136,248 | McLachlan | Nov. 8, 1938 |
| 2,253,947 | Blume et al. | Aug. 26, 1941 |
| 2,289,920 | Lennox | July 14, 1942 |